United States Patent Office 3,498,962
Patented Mar. 3, 1970

3,498,962
NON-FOGGING POLYOLEFIN FILM
Michael Francis Bruno, Circleville, Ohio, assignor to E. I. du Pont de Nemours and Company, Wilmington, Del., a corporation of Delaware
No Drawing. Continuation-in-part of application Ser. No. 221,317, Sept. 4, 1962. This application Oct. 26, 1965, Ser. No. 505,242
Int. Cl. C08f 45/06, 29/04
U.S. Cl. 260—93.7
2 Claims

ABSTRACT OF THE DISCLOSURE

A process for producing non-fogging polyolefin films by mixing a polyolefin or a copolymer of ethylene and a vinyl monomer with between 0.05% and 2% by weight of a surface active agent having the formula:

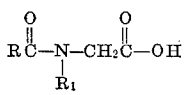

wherein R is an alkyl group having 7–17 carbon atoms and $R_1$ is an alkyl group containing from 1 to 4 carbon atoms, and thereafter melt extruding the polymeric resin into the shape of a film. The product of the above process useful for the packaging of various articles and materials, especially foodstuffs.

---

This application is a continuation-in-part of my copending application Ser. No. 221,317, filed Sept. 4, 1962, now abandoned.

This invention is concerned with packaging films. More particularly, it is concerned with polyolefin resin packaging films which are free from fogging when used for the wrapping of high moisture content materials.

In the development of films for the packaging of various articles and materials especially foodstuffs, major efforts have been directed toward providing films with low permeability to avoid moisture loss from the article or contamination of the article by undesired ambient vapors and with providing packages that are durable to avoid product loss during customer handling and the like. An attendant problem in the use of such packaging films, especially for the wrapping of products of high moisture content, is the tendency of moisture within the package to condense as droplets or as a fog on the inside surface of the package especially when the package is refrigerated. The resulting packaged product is unattractive and, further, the view of the product being displayed is obscured, thus defeating in part the purpose for using a transparent wrapping material.

A method has been proposed, as described in U.S. Patent 2,639,241 for incorporating various surface active agents in coatings for regenerated cellulose film, for example, to give non-fogging characteristics to the film. However, it is found that attempts to use agents such as described in that patent on the surface of polyolefins, and films of copolymers of ethylene and vinyl monomers renders such films unsuitable for many packaging applications because their ability to be heat sealed is impaired. Further, attempts to incorporate such agents as these in the polymeric resin prior to its being thermally formed into film form lead to the production of a discolored film, which moreover has no anti- or non-fogging characteristics.

It is therefore an object of this invention to provide a process for producing polyolefin films and films of a copolymer of ethylene and vinyl monomer which are non-fogging when in contact with moist atmospheres and which can be readily heat sealed. A more specific object is to provide a process for producing non-fogging films of a blend of low and high density polyethylenes. The foregoing and related objects will more clearly appear from the description which follows.

My invention resides in the discovery of a process for producing a non-fogging polyolefin film which, briefly stated, comprises admixing polymeric resin from the group consisting of polyolefin resin from at least one olefin having up to three carbon atoms, and copolymers of ethylene with a vinyl monomer copolymerizable with ethylene containing from 0.5 to 10% by weight of vinyl monomer based on the total weight of the copolymer, with between 0.05% and 2% by weight, based on the weight of said polymeric resin, of at least one surface active agent having the formula

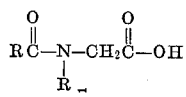

wherein R is an alkyl group having 7–17 carbon atoms and $R_1$ is an alkyl group containing from 1 to 4 carbon atoms, said surface active agent at the temperature of melt extrusion being resistant to thermal degradation and being sufficiently incompatible with the polymeric resin at ambient temperature conditions whereby during cooling of the extruded film said agent concentrates at the surface of said film, and thereafter melt extruding said polymeric resin material into the shape of a film, and cooling said film whereby to produce a non-fogging, transparent film having said surface active agent concentrated at the surface thereof.

In the practice of this invention, it is essential that the agent incorporated for resistance to fogging be resistant to thermal degradation that might occur during extrusion. Further it must not interfere with subsequent heat sealability of the films. The mechanism by which the nonfogging phenomenon is effected is not well understood. It has been determined, however, that an agent, to be effective in this process, must possess a rather critical lipophilic/hydrophilic balance or characteristic. The requirement would seem to be that the agent should be sufficiently compatible with the polyolefin that a clear film is produced, yet incompatible enough that it would be urged from the interior of the film toward the surface thereof at which site it should be sufficiently hydrophilic that it can act to lower the surface tension of the condensed water thus producing a continuous water layer rather than small water droplets. Unexpectedly I have found that wetting agents of the formula set out hereinabove, when used within the specified range of concentration, have these essential characterilstics. As representative agents of this structural formula there may be mentioned N-lauroylsarcosine, N-capryloylsarcosine, N-myristoylsarcosine, N-palmitoylsarcosine, N-stearoylsarcosine, N-myristoyl-N-ethylaminoacetic acid, N-lauroyl-N-butylaminoacetic acid, as well as mixtures of these agents.

Amounts of the surface active agents in the order of 0.05% to about 2% and higher, based on the weight of the polymer can be employed. However, amounts in the order of 0.05–0.5% and more especially 0.1 to 0.3% are the preferred amounts to be used to effect non-fogging characteristics without having an adverse effect on other desirable film characteristics such as heat sealability and the various optical properties.

The preferred method of incorporating the agent is to thoroughly admix it with the polymeric resin by dry blending or by working in the ingredients on a rubber mill, or the like. However, in some instances, agents of the type described herein could be applied in an organic or aqueous solvent to the preformed film in the manner of coating, spraying, dipping and the like. If an aqueous solution were to be used, the now conventional treatment of the polyolefin film surface with an electric discharge or flame aids in rendering the surface of the film wettable with the aqueous solution.

As the polymeric film-forming resin there may be employed any film-forming polyolefin, and particularly polyolefins from olefins containing from 1 to 3 carbon atoms, as well as copolymers of ethylene with at least one vinyl monomer copolymerizable therewith said copolymer containing from 0.5 to 10% by weight of vinyl monomer, such as copolymers of ethylene with vinyl acetate, vinyl propionate, vinyl butyrate, vinyl trimethyl acetate, vinyl tertiary-butylacetate, vinyl diethylacetate, vinyl beta,gamma-dimethylacetate vinyl benzoate; ethylacrylate, methyl acrylate, methyl methacrylate, etc. A preferred polyolen resin material is that obtained by suitably melt blending a polyethylene having a density below 0.925 gram/cc. at 25° C. with a linear polyethylene having a density of at least 0.935 gram/cc. at 25° C. A preferred copolymer is that obtained by the copolymerization of ethylene and vinyl acetate. It is understood, of course, that there may be added to the resin, fillers, pigments, silicious materials, anti-blocking agents, ultraviolet light stabilizing materials, etc., customarily employed in the fabrication of polyolefin film. Preferably, the extruded film is biaxially oriented in known manner to improve the physical characteristics thereof.

The following examples of certain preferred embodiments will serve to further illustrate the principles and practice of the invention.

EXAMPLE 1

A melt blend of 75% by weight of "Alathon" 1413 low density (0.915 gram/cc. at 25° C.) polyethylene resin and 25% by weight of "Alathon" 7020 high density (0.958 gram/cc. at 25° C.) polyethylene resin was combined with 0.2% by weight of N-lauroylsarcosine on a rubber mill. The resulting blend, having a density of 0.925 gram/cc. at 25° C., a crystalline melting point of 125° C., and a melt index of 0.39 was melt extruded through a 2-inch diameter annular extrusion die at a melt temperature of 215° C. and at a rate of 2.5 feet per minute to form a tubular film two inches in diameter. The extruded tubing was passed over an internal quenching mandrel maintained at 25° C. after which it was passed through an initial external heating zone wherein the temperature of the tubing was raised to 100° C.; thereafter, it was passed into a final heating zone wherein an internal heater raised the temperature of the tube to 115° C. whereupon the tubing was expanded circumferentially to a diameter of 10 inches by means of internal gas pressure and was stretched longitudinally by an increase in draw-off speed to 12.5 feet per minute. The stretched tubing was thereafter cooled and slit to form a flat film stretched 4.6 times its original dimension in the axial or longitudinal (MD) direction of the film and 5 times its original dimension in the transverse (TD) drection.

A portion of the film was formed into a bag, a head of lettuce was inserted in the bag, the opening of the bag was sealed and the bag was passed through a heating tunnel to shrink the film to a tight fit over the head of lettuce. When the package was refrigerated at 40° F., there was no indication of fogging on the interior of the bag. A strip of the same film was submitted to a heat sealing test wherein two strips of the film were sealed together under pressure of 10 pounds per square inch, 1 second dwell time at 175° C. A weld seal was obtained. Strong seals were also obtained using a wire sealer heated to 200° C.

For a control test, the same blend of high density/low density polyethylene resin was made into a film as described above except that the surface active agent was omitted. A similar packaged article showed heavy fogging on the interior surface. In still another control test, the experiment described above was repeated using sodium lauryl sulfate as the surface active agent in place of N-lauroylsarcosine. The resulting extruded film had a brownish color and it was not fog resistant.

EXAMPLE 2

Following the procedure described in Example 1, a series of experiments was carried out wherein the amount of surface active agent (N-lauroylsarcosine) incorporated in the polymer was varied over a range. The results of these experiments are shown below in tabular form.

| Experiment No. | Amount of Agent, percent | Remarks |
| --- | --- | --- |
| A | 0.1 | Some evidence of slight fogging after several hours—film remains heat sealable. |
| B | 0.2 | No evidence of fogging—film was heat sealable. |
| C | 1.0 | Non-fogging—film was heat sealable. |
| D | 1.5 | No indication of fogging but film was rather sticky apparently due to excessive exuding of the agent to the surface. |

In the preferred concentration range, that is, about 0.1 to 0.3% there was no indication of any degrading of desired film characteristics such as gloss, haze, transparency, response to printability treatment and no adverse effect was observed on such aspects as shrinkage force, tenacity, elongation or modulus. Moreover, the film retains its water impermeability.

EXAMPLE 3

A polypropylene resin having a density of 0.902 and containing 0.3% by weight of N-myristoylsarcosine was extruded into film by the process of Example 1. Extrusion temperature was 225° C., temperature of the tubing in the initial heating zone was 125° C. and in the final heating zone was 150° C. Bubble pressure was 24 inches of water. The final diameter of the tubing was 10 inches, initial rate of drawing was 2.6 feet per minute and final rate of drawing was 13 feet per minute. The resulting clear film showed no indication whatever of developing fog when exposed to a moist atmosphere, whereas a control film made of the same resin but without the surface active agent showed droplets of water adhered to the surface when tested under the same conditions.

EXAMPLE 4

A linear polyethylene resin having a density of 0.954 and containing 0.2% by weight of N-myristoylsarcosine blended therewith was melt extruded into film following the process of Example 1. Extrusion conditions were the same as shown in Example 1 except that the temperature of the film in the initial heating zone was 115° C., bubble pressure was 8 inches of water, temperature of the film in the final heating zone was 125° C., final diameter was 12 inches, final rate of drawing was 14.5 feet per minute. The resulting film, stretched 6 times in the MD and TD directions was clear, showed no evidence of fogging when in contact with a moist atmosphere, nor impairment of heat sealability or optical properties. A control film made without the addition of the surface active agent showed heavy fogging in contact with a similar moist atmosphere.

EXAMPLE 5

The blend of low density polyethylene and high density polyethylene described in Example 1 was melt blended with 0.2% by weight of N-caryloylsarcosine and then extruded into film following the procedure described in Example 1. The resulting film showed no evidence of fogging when subjected to moist atmosphere, and the properties of the film were otherwise essentially those of a film without the addition of N-capryloylsarcosine.

EXAMPLE 6

Following the procedure described in Example 1, a melt blend of 75% by weight of "Alathon" 1412 low-density polyethylene resin and 25% by weight of "Alathon" 7020 high-density polyethylene resin was combined with 0.2% by weight of N-stearoylsarcosine on a rubber mill. This blend formed into a film following the procedure described in Example 1 was found to have a very slight tendency toward fogging when in contact with a moist atmosphere, whereas the same blend in which the N-stearoylsarcosine was omitted showed heavy fogging when in contact with the same atmosphere.

EXAMPLE 7

The blend of low density polyethylene and high density polyethylene specified in Example 1 was melt blended with 0.2% by weight of N-myristoyl-N-ethyl-aminoacetic acid. As in the previous examples the polyethylene film was in no way degraded by the addition of surface active agents, and its resistance to fogging under high moisture conditions was good.

EXAMPLE 8

A blend of high and low density polyethylene and 0.2% by weight of N-lauroyl-N-butylaminoacetic acid was prepared and melt extruded in film form as set forth in Example 1. The film showed good resistance to fogging while retaining the heat-sealability and optical properties of film made from the same blend sans the surface active agent.

EXAMPLE 9

A blend of high and low-density polyethylene and 0.1% by weight of N-lauroylsarcosine and 0.1% by weight of palmitoylsarcosine was prepared and melt extruded in film form as described in Example 1. The resulting film showed no evidence of fogging when subjected to a moist atmosphere; it retained the heat-sealability and optical properties of film made from the same blend without the surface active agents.

EXAMPLE 10

A blend of high and low-density polyethylene and 0.2% by weight of N-palmitoylsarcosine was prepared and melt extruded into film as set forth in Example 1. As in the previous examples, the film was in no way degraded in the addition of the surface active agent and its resistance to fogging under high moisture conditions was good.

It is apparent from the foregoing description and examples that the salient advantage of this invention is that full advantage of the protective features of films can be taken in the wrapping of high moisture content articles without detracting from the appearance of the packaged article. The merchandising appeal of such a development is at once apparent.

EXAMPE 11

An ethylene/vinyl acetate copolymer resin containing 3.5% by weight of vinyl acetate, having a density of 0.918 and containing as additives 5.0% of polyethylene having a density of 0.954, 0.52% of silica and 0.01% of 2,6-ditertiary butyl-4-methyl phenol as antioxidant was melt blended with 0.1% by weight of N - lauroylsarcosine and was thereafter extruded into film form following the procedure described in Example 1. To test the anti-fogging character of the films samples of the film were used as covers on cups containing fresh string beans. The covered cups were placed in a refrigerator held at approximately 40° F. and were checked for appearance after ½ hour, 1 hour, 2 hours and 4 hours. There was no evidence of fogging on the inside film surfaces. On the contrary, when a film made from the same resin without the N-lauroylsarcosine and subjected to the same test, the film covers were badly fogged, showing droplets of water adhered to the inside film surfaces. It was observed also that incorporation of the N-lauroylsarcosine into the copolymer resin was effective in imparting anti-static properties. In an illustrative experiment the test film described above was rubbed on a khaki fabric 4 times and was then dusted with finely pulverized cigar ashes. On tilting the sample sheet on edge the ashes showed no tendency to stick to the film. In a control film, wherein the N-lauroylsarcosine was not incorporated in the copolymer resin, the pulverized cigar ash clung firmly to the sheet. Surface conductivity measurements also showed the test film to be much more highly conductive than the control film without the surface active agent, indicating it was much less susceptible to accumulating a static charge on its surface.

What is claimed is:

1. A film-forming composition comprising polypropylene having incorporated therein at least 0.05 percent by weight, based on the weight of said polypropylene, of at least one surface active agent represented by the formula:

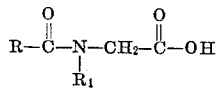

wherein R is an alkyl radical containing from about 7 to about 17 carbon atoms and $R_1$ is an alkyl radical containing from about 1 to about 4 carbon atoms.

2. A method for producing fogging-resistant polypropylene film composition which comprises admixing polypropylene resin and at least 0.05 percent by weight, based on the weight of said polypropylene, of at least one surface active agent represented by the formula:

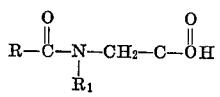

wherein R is an alkyl radical containing from about 7 to about 17 carbon atoms and $R_1$ is an alkyl radical containing from about 1 to about 4 carbon atoms, and extruding said polypropylene resin into a film.

References Cited

UNITED STATES PATENTS 3,145,111    8/1964    Norton _____ 260—312

SAMUEL H. BLECH, Primary Examiner

C. J. SECCURO, Assistant Examiner

U.S. Cl. X.R.

106—13; 260—41, 87.3, 86.7, 94.9, 897